March 2, 1971     S. KORMAN     3,567,517
PROCESS FOR PREPARING CADMIUM ELECTRODES
Filed May 29, 1968
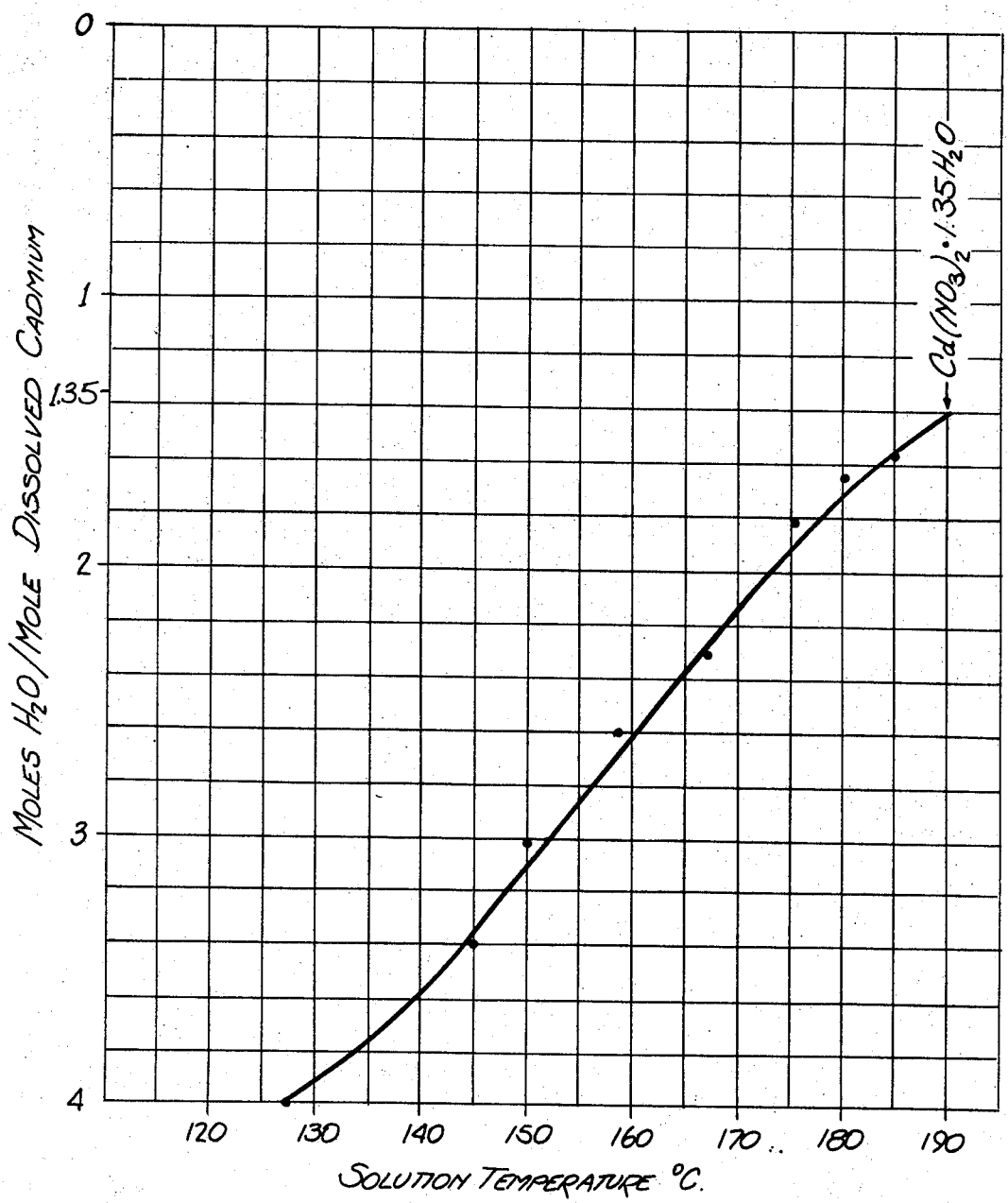
INVENTOR.
SAMUEL KORMAN
BY
Ward, McElhannon, Brooks & Fitzpatrick
ATTORNEYS United States Patent Office 3,567,517
Patented Mar. 2, 1971

3,567,517
PROCESS FOR PREPARING
CADMIUM ELECTRODES
Samuel Korman, Hewlett, N.Y., assignor to Portable
Power Corporation, New York, N.Y.
Filed May 29, 1968, Ser. No. 733,061
Int. Cl. H01m 35/30, 43/04
U.S. Cl. 136—24                    1 Claim

ABSTRACT OF THE DISCLOSURE

The disclosure relates to novel aqueous cadmium solutions wherein the ratio of water to cadmium is in the range of about 1.3 to less than 4.0 and preferably between 1.3 to 3.0. The solutions are prepared by removing water from molten cadmium nitrate tetrahydrate and are used to impregnate porous matrices to form cadmium electrodes of high capacity.

BACKGROUND OF THE INVENTION

This invention relates to novel solutions of cadmium salts, novel cadmium-impregnated plaques and the method for preparing the same.

Porous plaques impregnated with electrolytically active metals such as cadmium have found wide commercial acceptance. In particular, such plaques are used in the manufacture of secondary power sources of the alkaline electrolyte type, notably nickel-cadmium batteries.

Cadmium electrodes for such batteries typically comprise a porous plaque, the pores of which contain an electrolytically active form of cadmium. Techniques heretofore known and practiced for preparing such electrodes have certain shortcomings which have severely limited the areas of use of alkaline batteries. In particular, the preparation of the electrodes has been unduly time-consuming and expensive, and the cost of the finished battery is proportionately increased. Moreover, the electrodes produced may have low capacity, a non-uniform structure, or structural deficiencies.

The most common technique for preparing cadmium electrodes involves immersing a porous conducting matrix in a concentrated aqueous solution of a cadmium salt, typically cadmium nitrate, and thereafter electrolyzing the impregnated plaque in an alkaline electrolyte to "form" or activate the electrode. Heretofore, the impregnating solutions employed in the art have been molten cadmium nitrate tetrahydrate, or solutions of lower concentration. Using these solutions, it has been found that a single impregnating step is not sufficient to introduce the maximum desired amount of cadmium into the porous matrix. Accordingly, it has been found necessary to subject the matrices to repeated impregnations, each of which is followed by electrolysis and prolonged washing, in order to obtain a high capacity electrode. This procedure greatly increases the cost of manufacturing such electrodes.

SUMMARY OF THE INVENTION

The present invention provides novel cadmium solutions which contain dissolved cadmium in high concentration. It further provides the process for using such solutions to produce cadmium-impregnated plaques. The invention also relates to novel impregnated plaques suitable for the preparation of cadmium electrodes.

In accordance with certain of its aspects, this invention provides novel aqueous solutions comprising cadmium ions and nitrate ions wherein the molar ratio of water to dissolved cadmium is less than 4 and preferably less than about 3.5, most preferably tbetween about 1.3 and 3, say 2. Impregnation of porous matrices with these novel solutions permits the preparation of electrodes of high capacity using a single impregnation step with no subsequent washing.

These novel cadmium solutions are conveniently prepared by removing water from cadmium nitrate tetrahydrate. Although any suitable technique for removing water can be employed, the preferred method involves evaporation of water from molten cadmium nitrate tetrahydrate at elevated temperatures.

For example, cadmium nitrate tetrahydrate can be heated at atmospheric pressure past its melting point to the point at which it begins to boil, about 128° C. Continued boiling of the solution then results in loss of water and an increase in the boiling point. At a boiling point of about 145° C., about 15% of the original water of hydration has been lost and the solution has a water-to-cadmium ratio of about 3.4. At a boiling point of 150° C., about 25% of the water is removed and the molar ratio is about 3. Similarly, boiling points of 158° C., 166° C., 175° C., 180° C., 185° C. and 190° C. correspond, respectively, to removal of about 35%, 43%, 55%, 59%, 62% and 65% of the original water of crystallization and molar ratios of about 2.6, 2.3, 1.8, 1.6, 1.5 and 1.4. The accompanying drawing graphically represents the composition and boiling point of such solutions at atmospheric pressure. All of these solutions remain clear at the boil, with no evidence of appreciable precipitation. Boiling can be continued further, up to a boiling point of 200° C. or higher, with accompanying further reduction in the water-to cadmium ratio. However, at ratios below about 1.3, it is found that decomposition of the dissolved salt may occur with release of nitric oxide fumes. The decomposition is accompanied by the increase in the free acid of the solution. This increase is undesirable because the acid so produced attacks the sintered metal matrix thereby weakening it. Furthermore, the solubility limits of the dissolved salt may be exceeded and solids may precipitate from solution. In order to avoid these complications, it is preferred that the water-to-cadmium ratio should not be reduced below about 1.3. Since it is desirable to obtain as concentrated a solution as possible, it is preferred to maintain the ratio as close to 1.3 as practicable even if some precipitation of salt occurs, although improved results are realized even at ratios as high as about 3.5. Removal of the water can, if desired, be facilitated by the use of reduced pressures. Since, however, high temperatures are required to maintain a clear solution at the lowest ratios, it is generally not preferred to employ pressures lower than atmospheric. In general, it is preferred though not essential, to maintain temperatures high enough to avoid precipitation of cadmium throughout the process of removing water. When desired, superatmospheric pressures can be employed to raise the boiling point of the solution, but generally this is not deemed necessary.

The present highly concentrated solutions are useful in the preparation of cadmium electrodes by impregnation of a porous matrix. Due to the substantially increased concentration of dissolved cadmium, as compared to solutions heretofore used, greatly increased amounts of cadmium are introduced into the matrix in a single impregnation.

The matrices or plaques which are employed in the practice of this invention are any of the porous bodies which have been used in the fabrication of electrodes. They may, for example, be porous carbon or graphite blocks, blocks of sintered metal powder, metal screens or grids, wire cloth, metallized asbestos or ceramic plates, etc. Sintered metal powder blocks are generally preferred and sintered nickel plaques prepared from fine nickel powder derived from the thermal decomposition of nickel carbonyl are particularly preferred. The degree of porosity, size of pores and overall size of the plaque will vary according to the desired end use of the electrode.

Any suitable impregnation means can be employed to load the porous matrix with the metal salt solution. Simple immersion of the porous matrix in the solution is adequate. Vacuum impregnation can be used if desired. Breaking the vacuum while the plaque is immersed in the impregnating solution can be helpful in increasing the amount of material retained. Superatmospheric pressures can be used during immersion to facilitate impregnation.

In practice, the solutions can be heated to the boiling point corresponding to the desired solution composition and the porous plaques immersed therein for a period of time sufficient to permit thorough impregnation, say 5 to 10 minutes. During the immersion, the solution can be maintained at the original temperature or higher to maintain a clear solution, or preferably, it can be cooled somewhat to induce precipitation of the cadmium salt in the interstices of the matrix. Since the salt deposited in the matrix is apparently the anhydrous form rather than the tetrahydrate, the amount of cadmium retained is substantially increased.

Following the impregnation, the matrix is separated from the impregnating solution before the melt or solution solidifies into a single mass. Any excess surface deposit of salt present on the matrix can be removed, if desired, but such deposit is normally small and is allowed to remain.

The impregnated matrices are then further treated to convert the cadmium to the desired electrolytically active form. Typically, this is accomplished by cathodic activation in an alkaline electrolyte, preferably an aqueous alkali metal hydroxide solution, at a current density of the order of about 1 to 1.5 amperes per square inch for a period of time sufficient to achieve activation of the electrode. Other techniques useful in connection with impregnated plaques, such as treating with aqueous carbonate, heating and electrolyzing as described in U.S. patent application Ser. No. 629,329, filed Apr. 7, 1967, in the name of John T. Owen; treating with aqueous carbonate and electrolyzing at high current density, as described in U.S. patent application Ser. No. 661,501, now U.S. Pat. 3,507,697 filed Aug. 15, 1967 in the name of Samuel Korman; or decomposition of nitrate with enediol compounds as described in the aforementioned Owen application, can be employed in the present invention.

If desired, the impregnated matrices can be compressed after electrolysis, to reduce their size. This is accomplished simply by applying pressure in a uniform manner over the opposite flat surfaces of the impregnated matrix until the desired degree of compression is attained. Reduction in thickness of the order of about 25% to 50% is feasible.

Cadmium electrodes prepared in accordance with the present invention and employing only a single impregnation are found to have very high capacity. It is possible, if desired, to subject the matrix to a series of impregnation and electrolysis steps, but this is normally not deemed necessary since a single impregnation produces an electrode with ample capacity for commercial acceptance.

To prepare a nickel-cadmium battery, the fully activated cadmium negative electrodes are assembled with a suitable number of nickel positive electrodes, allowance being made for the high capacity of the cadmium electrodes of the invention. Convention separators, electrolytes, battery cases and terminals are employed.

Practice of certain specific embodiments of the invention may be observed from the following illustrative examples.

EXAMPLE I

A quantity of 400 g. of cadmium nitrate tetrahydrate is heated in a beaker to melt the crystals and form a solution. The solution is then boiled, with the weight loss due to evaporation of water being determined periodically, until the solution becomes turbid, which indicates the precipitation of cadmium salt. The solution is boiled until a boiling point of about 185° C. is reached. A very small amount of fresh hydrated salt is then added to clarify the slightly turbid solution, and the heat supplied is reduced to maintain the clear solution just below its boiling point. The estimated water loss due to evaporation at this point is equivalent to about 50% of the original water content of the tetrahydrate, the molar ratio of water to cadmium being about 2.

Two conventional porous nickel plaques, about 1.6 in. x 2.5 in. x 0.15 in., are immersed in the solution for ten minutes, then removed and cooled in air. These plaques are then activated by connecting them as cathodes in a system with nickel-impregnated matrices as anodes in a 30% by weight aqueous potassium hydroxide electrolyte, and passing a current of 11–12 amperes (about one and one-half amperes per square inch) for about fourteen hours.

The plaques are rinsed for handling, dried, compressed from .15 in. to .09–.10 in. and assembled into a cell, together with three nickel positive plates of the size, 1.6 in. x 2.5 in. x 0.15 in. by using paper separators and a 30% potassium hydroxide electrolyte. The cell capacity is checked by a seven-hour charge at 0.9 amp followed by a five-hour discharge.

Two cells made according to the above procedure show a capacity of 4.5 ampere-hours. The total dry weight of the five plates, three positive and two negative, is about 120 g., so that the capacity figure realized corresponds to an energy output of 5.4 watt-hrs., or an energy density of 20.25 watt-hrs./lb., these representing a high order of capacity for the cadmium electrodes.

EXAMPLE II

The general procedure of Example I is repeated, with the modifications hereinafter noted. A quantity of 1166.0 g. of cadmium nitrate tetrahydrate, containing 272.0 g. of water of crystallization and equivalent to 894.0 g. of anhydrous cadmium nitrate, is melted in a beaker at 60° C. and the solution is progressively heated to a boiling point of about 190° C., with measurements being made at intervals to determine the boiling point and solution composition. The data obtained are graphically represented by plotting the molar ratio of water to dissolved cadmium as shown in the accompanying drawing. As shown in the drawing, the molar ratio decreases from 4 to 1.35 during the process, the latter figure corresponding to the removal by evaporation of 66% of the original water at a solution temperature of 190° C. The final solution, boiling at about 190° C., is employed herein.

Two plaques are immersed at 193° C. into the concentrated impregnating solution, comprising 987.5 g. of solution having a water-to-cadmium ratio of about 1.35. During the 5 to 10 minute period of immersion, the solution temperature is maintained above 185° C., with the solution being clear for most of this time. It is then allowed to cool to about 170° C. or less causing a precipitate to appear. The two plaques are then removed from the solution, cooled in air, and placed as cathodes in an electrolyte solution for activation as in Example I, except that in this example the current of 12 amperes is passed through the solution for 19 hours. Cells utilizing the singly impregnated, activated, and compressed plates are then constructed as in Example I, with equally satisfactory results. It is found that two singly impregnated cadmium negative plates prepared in accordance with this invention, in conjunction with three nickel positive plates, can be made to produce the same capacity as two commercial plates prepared by conventional multiple impregnation methods.

What is claimed is:

1. The process for preparing cadmium electrodes which consists essentially of immersing a porous conducting matrix in an aqueous solution comprising cadmium ions and nitrate ions wherein the molar ratio of water to dissolved cadmium is between about 1.3 and 3.0, thereby forming an impregnated matrix, and subjecting said impregnated matrix to cathodic activation.

References Cited

UNITED STATES PATENTS

| | | | |
|---|---|---|---|
| 2,708,211 | 5/1955 | Koren et al. | 136—28 |
| 2,831,044 | 4/1958 | Bourgault et al. | 136—29 |
| 2,952,570 | 9/1960 | Heuninckx | 117—230 |
| 3,068,310 | 12/1962 | Casey et al. | 136—24 |
| 3,258,361 | 6/1966 | Kahn | 136—24 |
| 3,314,822 | 4/1967 | Jost | 136—29X |

ALLEN B. CURTIS, Primary Examiner

A. SKAPARS, Assistant Examiner

U.S. Cl. X.R.

136—76